United States Patent [19]

Taylor et al.

[11] Patent Number: 5,079,307
[45] Date of Patent: Jan. 7, 1992

[54] HIGH MOLECULAR WEIGHT POLYAMIDE PRODUCTION FROM DICARBOXY TERMINATED POLYAMIDE PREPOLYMER

[75] Inventors: Stephen A. Taylor; Matthew B. Studholme, both of West Lothian, Scotland; Murray R. Orpin, South Glamorgan, Wales

[73] Assignee: BP Chemicals (Additives) Limited, London, England

[21] Appl. No.: 557,168

[22] Filed: Jul. 23, 1990

[30] Foreign Application Priority Data

Jul. 26, 1989 [GB] United Kingdom ............... 8917093

[51] Int. Cl.⁵ .............................................. C08G 69/48
[52] U.S. Cl. .................................. 525/420; 525/419; 528/335; 528/336
[58] Field of Search ............... 525/420, 419; 528/335, 528/336

[56] References Cited

U.S. PATENT DOCUMENTS 4,760,129 7/1988 Haering et al. ..................... 525/481

Primary Examiner—Harold D. Anderson
Attorney, Agent, or Firm—Brooks Haidt Haffner & Delahunty

[57] ABSTRACT

This invention relates to a process for producing polyamides of high molecular weight from dicarboxy terminated prepolymers of relatively lower molecular weight by further polymerization in an extruder in the presence of an additive comprising a diamine.

The polyamides so formed are suitable for producing fabricated articles such as films, pipes, containers etc.

11 Claims, 1 Drawing Sheet

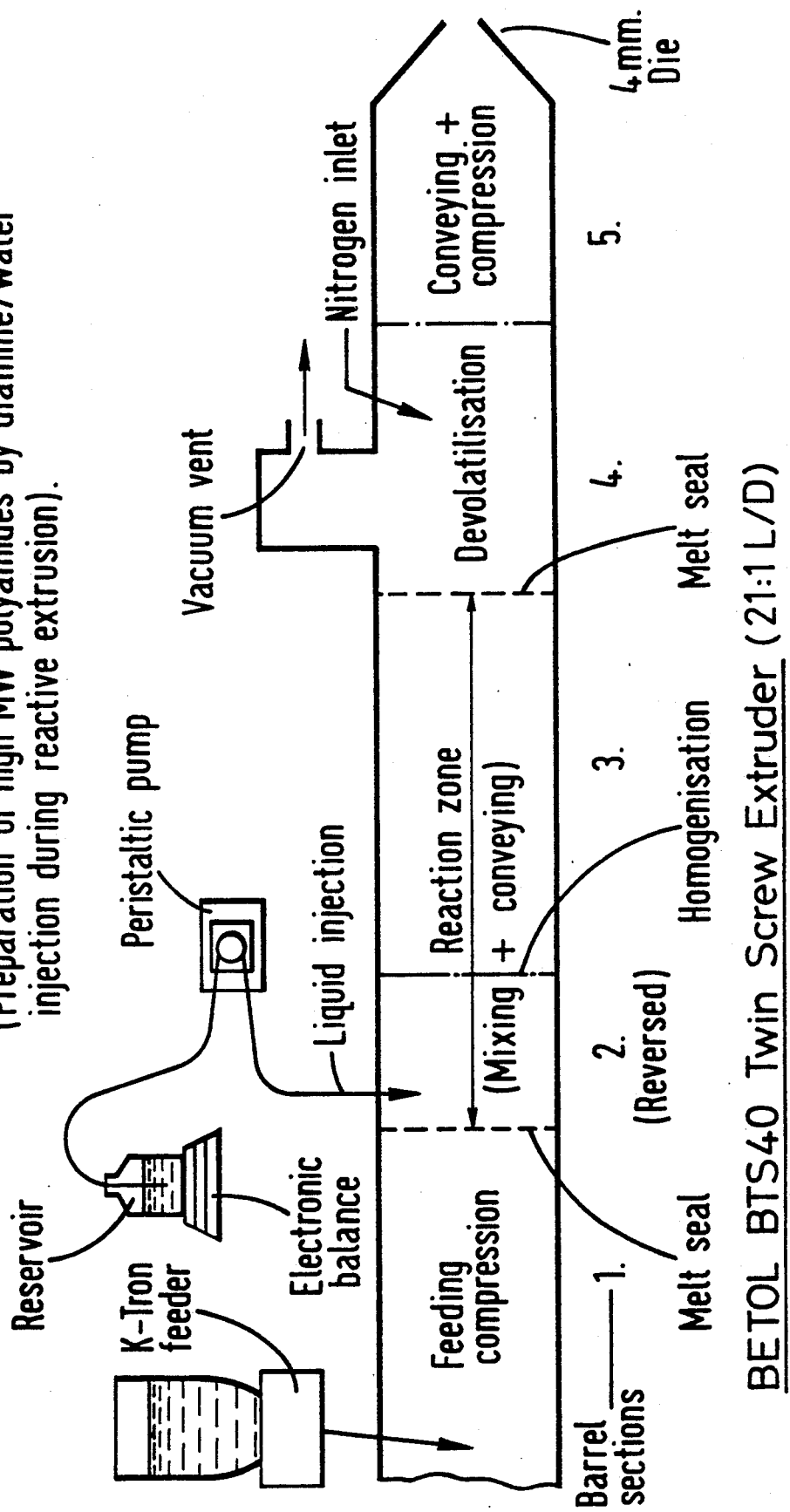

HIGH MOLECULAR WEIGHT POLYAMIDE PRODUCTION FROM DICARBOXY TERMINATED POLYAMIDE PREPOLYMER

This invention relates to a process for the preparation of polyamides of high molecular weight which are suitable for further processing in extruders to form fabricated articles, especially films, pipes, containers etc. Typical molecular weights for polyamides produced by this process fall within the range 28,000–35,000, corresponding to an inherent viscosity of 1.3–2.0 dlg$^{-1}$ when measured as a 0.15% w/v strength solution in concentrated sulphuric acid (BDH Ltd, UK, Analar grade 98% min. Assay) at 25° C.

In conventional polyamide processes, a nylon salt (1:1 molar adduct of a diamine and a dicarboxylic acid) is precondensed at elevated temperatures and pressures to give a low molecular weight polyamide prepolymer. This may be carried out either batchwise or in continuous reactors (e.g. column or tubular devices). The prepolymer thus formed has an exact equivalence of amine and carboxylic acid end groups and forms the feedstock for "postpolycondensation" or molecular weight enhancement. This second stage process may be carried out in a batch reactor at elevated temperatures (but below the melting point of the prepolymer) under a gas inert under the reaction conditions, or in vacuo, or, as a continuous process using screw devices. U.S. Pat. No. 4,760,129 (Werner and Pfléiderer) provides a summary of prior art in this area.

It is significant that all prior art processes rely upon the prepolymer having an exact stoichiometric balance between acid and amine to allow the production of high molecular weight polymers. Slight excesses of either acid or amine groups will have a deleterious effect upon achievable molecular weight, as is well known and described in the literature. Thus, effort must be made to contain volatile reactants within the reacting system during the first stage (prepolymer preparation) of the process, whilst eliminating water of condensation. Typically the diamines form the volatile component(s) of the reacting mixture. This requirement limits flexibility in terms of processing capability and the grades of polyamides which may be prepared.

The object of this invention is to provide a process for the preparation of high molecular weight polyamides from di-carboxy-terminated polyamide prepolymers, which in turn are prepared from appropriate nylon salts.

Accordingly, the present invention relates to a process for producing high molecular weight polyamides from polyamide prepolymers having relatively lower molecular weight by further polymerisation, characterised in that the prepolymer is a di-carboxy-terminated polyamide and the further polymerisation is carried out in an extruder in the presence of an additive comprising a diamine which may be the same as or different from the diamine used to produce the prepolymer.

By "di-carboxy-terminated polyamide prepolymer" is meant here and throughout the specification that the prepolymer is terminated by a carboxy group at both ends of said prepolymer.

A nylon salt feedstock, which can be an adduct of an aromatic dicarboxylic acid e.g. terephthalic acid (TPA), isophthalic acid (IPA), or 2,6-naphthalene dicarboxylic acid (NDA) and an aliphatic or cycloaliphatic diamine e.g. hexamethylene diamine (HMD), trimethylhexamethylene diamine (TMHMD) (mixture of 2,2,4 and 2,4,4 isomers), isophorone diamine (IPD), meta- and para- xylylene diamine (MXD and PXD), dodecamethylene diamine (DDMD) and 4,4'-methylenebis(cyclohexylamine) (MBCHA), is used to prepare a prepolymer of number average molecular weight up to 5000.

The prepolymer may be formed either by a batch process or by a continuous process. In the batch process an aqueous solution of the nylon salt is heated in a suitable, stirred reactor to an elevated temperature. In a continuous process such a step can be achieved, especially in the case of a nylon salt which forms a dry cake at elevated temperatures when the aqueous solution method is used, by extrusion in the presence of a condensation catalyst under the influence of heat and vacuum.

This latter process involves the polycondensation of suitable nylon salt blend in a co-rotating fully intermeshing twin screw extruder, incorporating a powder seal and utilising efficient vacuum devolatilisation to remove unreacted diamine and water of condensation. It is important to remove these components to minimise one or more of decomposition, discolouration and gel formation, and to advance the polycondensation reaction. Typical reaction times in the extruder at a screw rotation speed of 100 rpm lie in the range 5–15 minutes at polycondensation temperatures in the range 240°–310° C. and a catalyst (such as e.g. ammonium hypophosphite) in concentrations of about 0.1%. The thus formed di-carboxy-terminated polyamide prepolymer is incapable of further polymerisation in the extruder to higher molecular weights because of the absence of additional diamine functionalities. Only on supply of additional diamine to the reaction can further polymerisation to higher molecular weight products occur. The volatile materials removed above may be treated in a number of ways. For Example:

a) condensation of the volatiles, analysis of the liquid condensate formed for diamine content and recycle of diamines for nylon salt preparation;

b) separation of diamine from volatiles by fractional distillation and recycle of the diamines for either nylon salt preparation or for the injection process described below; or c) concentration of the condensed liquid containing water and diamine by removal of water and subsequent recycle of the diamine as described in (a) or (b).

The diamine recycling procedure is necessary to maintain an economic process and reduce levels of hazardous waste materials.

The prepolymer feedstock produced can be used in the form of a melt, or in a granulated or powdered form prior to further processing. The prepolymers suitably have a maximum inherent viscosity of 0.4 dlg$^{-1}$, measured as described above and corresponding to a number average molecular weight of up to 5000.

The prepolymer feedstock may be blended with polymerisation aids e.g. catalysts, molecular weight regulators, colour stabilisers etc. prior to further processing. Typical polymerisation aids (such as catalysts) include ammonium hypophosphite and metal hypophosphites. Typical molecular weight regulators include monofunctional carboxylic acids and amines (preferably non-volatile at the temperature of polymerisation) e.g. benzoic acid. Colour stabilisers such as organic phosphonites (for example Irgafos P-EPQ, ex Ciba Geigy), transition metal salts (e.g. copper containing compounds) and hindered phenols (for example Irganox MD1024, ex Ciba Geigy).

A preferred example utilises the following additives:

|  | % by weight |
|---|---|
| Ammonium hypophosphite | 0.1 (from 1st stage reaction) |
| Sodium hypophosphite | 0.3 |
| Benzoic acid | 0.2 |

The "catalyst package" or polymerisation aid is preferably a mixture of ammonium and sodium hypophosphite, incorporated at levels of 0.025-0.25% and 0.1-0.5%, preferably 0.1 and 0.3% by weight respectively.

Adequate dispersion of additives in the polyamide prepolymer is essential if optimum polymer properties and molecular weights are to be achieved. Suitable granulating or crushing/particle size reduction devices which are commercially available can be used as appropriate.

The polyamide prepolymer and additives form the feedstock for further polymerisation to high molecular weight polyamides in an extruder. The extruder is suitably a twin screw extruder for producing continuously high molecular weight polyamides from a low molecular weight feedstock. Such processes are well known but require exact stoichiometry of acid to amine groups in the prepolymer feedstock if high molecular weight materials are to be prepared. The present process uses an amine deficient-prepolymer feedstock ("di-carboxy-terminated polyamide prepolymer") and additional diamine introduced during the processing and/or polymerisation step. The additional diamine is introduced into the extruder barrel and onto the extruder screws via an injection system.

The screw extruder is suitably a twin screw of the fully intermeshing type with both screws rotating in the same direction, although other twin screw extruder types e.g. counter-rotating non-intermeshing, may also be used for the process. A typical extruder of the co-rotating fully intermeshing screw type is the Betol BTS range. A Betol BTS40 machine (40 mm screw diameter) of 21 diameters length was used for this work, although the length of the barrel and diameter of the screws may be increased if required.

A schematic representation of the extruder set-up for performing the polymerisation process is given in Diagram 1. An optimised screw element composition for the process is given in Table 1.

A number of extruder variables can affect the nature of the high molecular weight polyamide formed by this process. These include screw speed, reactant feed rate, barrel temperature profile and vacuum level. An indication as to the effect of each of these variables may be gleaned from Table 2. Feed rates were optimised at 1.2 Kghr$^{-1}$ for the extruder in question and screw speeds of 100 rpm produced polymer of the highest molecular weight and best colour. Recommended operating conditions are given in Table 3.

The level of vacuum under which devolatilisation is carried out will affect the final molecular weight of the polyamide. If the vacuum level is insufficient, low degrees of conversion to polymer may be observed during formation of the extrudate. Very high vacuum levels result in air being drawn into the extruder with consequent oxidative degradation of the polyamide. In general, it is preferred to use an efficient vacuum which is adjusted by a bleed of nitrogen gas at or after the vacuum vent. Thus, in the process described here, a vacuum level of >25 in.Hg was reduced to 15-20 in.Hg using a nitrogen gas bleed.

A further variable is the nature of the diamine injection, which may comprise either a single diamine or a mixture of diamines. From Table 2 it can be seen that in the absence of an injection step, no conversion of the prepolymer feedstock to higher molecular weights occurs. It is preferable to inject into the extruder an aqueous solution of the additional diamine in order to achieve high degrees of conversion to high molecular weight polymers. The concentration of the additional diamine in the aqueous solution injected may vary within the range 1-99% by weight of the additional diamine in water, but is preferably in the range 50-60% by weight of the additional diamine.

If water alone is injected into the extruder, no polymerisation occurs, demonstrating the effect of using a combination of water and diamine in the solution injected. The diamine may be injected at one or more points into the extruder.

For a relatively short extruder barrel, a further processing step (i.e. a second pass through the extruder) may be necessary to achieve the desired high molecular weight. Alternatively, the short extruder may be connected, via a melt transfer pipe, to a second extruder thus increasing the effective processing length of the system.

In general, any water soluble diamine may be used for this process, but hexamethylene diamine or meta-xylylene diamine give particularly desirable final polymer properties. Prepolymer feedstock may comprise either a single prepolymer or a mixture of prepolymers, prepared from the diamines and aromatic dicarboxylic acids described earlier. A particularly useful prepolymer can be prepared from terephthalic acid and trimethylhexamethylene diamine (2,2,4 and 2,4,4 isomeric mixture).

Once stoichiometry has been achieved, efficient vacuum devolatilisation is required to remove water vapour, water of condensation and traces of unreacted diamine.

The rate of diamine addition will be dependant upon, amongst other things, throughput rate and diamine volatility. Although it is possible to calculate the required rate of aqueous diamine addition, in practice it is preferred to determine the rate by experimentation.

1) For a throughput rate of 1.2 Kghr$^{-1}$ of a TPA/TMHMD prepolymer which was 10 mol % deficient in amine content, an injection rate of 600 g of a 60% solution of HMD per hour (corresponding to 360 g/hr HMD) was found to be optimum.

2) Under similar operating conditions, an injection rate of 600 g of a 60% solution of MXD per hour (360 g/hr MXD) was found to be optimum.

During the extrusion the barrel temperature is suitably in the range from 150°-300° C., preferably from 200° C. to 275° C.

Excess diamine removed under vacuum devolatilisation should be condensed and recycled as outlined earlier.

A specific example of the reactive extrusion process for the preparation of TPA/TMHMD/MXD polyamide polymers is as follows. TPA/TMHMD prepolymer (finely ground) was mixed with the appropriate "catalyst package" to give an even dispersion of solids. This mixture was fed into a Betol BTS40 twin screw extruder (40 mm diameter screws, 21L/D) via a "K-Tron" volumetric feeder at a rate of 1.2 Kghr$^{-1}$. Screw speed was set at 100 rpm and extruder barrel temperatures were preset at 220/270/270/270/260/250 for barrel sections 1 to 5 and die respectively. Once output had commenced, a vacuum level of 25 in.Hg was introduced into the extruder barrel and reduced to 20 in.Hg via nitrogen gas bleed. A 60% aqueous solution of MXD was then injected into the prepolymer melt at a rate of 360 mlhr$^{-1}$. The thus formed polymer extrudate was cooled in a water bath and granulated for subsequent processing.

The advantages of the present process may be summarised as follows:

1. exact acid-amine stoichiometry of the prepolymer feedstock is not required,
2. polymer structure may be controlled by variation in prepolymer and diamine feedstocks,
3. polyamide structures may be prepared which are difficult to obtain by other commercial process routes used hitherto,
4. only low levels of waste polymer are formed,
5. the high molecular weight polymer formed has excellent colour and is free of gel particles,
6. this is a continuous process which may be integrated to facilitate processing from nylon salt to fabricated articles in a single unit.

TABLE 1

Optimised screw element composition
(Preparation of high MW polyamides by diamine/water injection during reactive extrusion).

| ELEMENT | 36/F | 16/F | MD X3 | 12 | TL X4 | 12 | 12 | MD X4 | 24 | 16 | 12 |
|---|---|---|---|---|---|---|---|---|---|---|---|
| LENGTH/MM | 120 | 80 | 35 | 80 | 20 | 120 | 60 | 45 | 150 | 80 | 80 |

Total length of screw = 870 mm.
KEY:
numeral, x = standard forward-flighted screw with pitch of x mm and having a closed trapezoidal profile.
numeral/F = open profile feed screw.
MD = mixing/melting/barrier discs.
TL = trilobal kneading elements.

TABLE 3

Extrusion operating conditions (40 mm twin-screw)
Preparation of high MW polyamides by diamine/water injection during reactive extrusion).

| SCREW SPEED | 100 rpm |
|---|---|
| OUTPUT | 1.2-1.5 Kghr$^{-1}$ |
| TEMPERATURES, | |
| ZONE 1 | 200° C. |
| 2 | 275° C. |
| 3 | 275° C. |
| 4 | 275° C. |
| 5 | 270° C. |
| Die | 250° C. |
| VACUUM | Set at 25 in. Hg, reduced to 20 in. Hg with N$_2$ bleed |
| DIAMINE/WATER RATIO | 60/40 |
| INJECTION RATE | 10 ml/min. |

We claim:

1. A process for producing a high molecular weight polyamide comprising prepolymerizing a nylon salt to produce a relatively low molecular weight dicarboxy terminated polyamide prepolymer and further polymerizing said prepolymer with a diamine in an extruder to produce said high molecular weight polyamide.

2. A process according to claim 1 wherein the prepolymer is produced from a nylon salt feedstock which is an adduct of an aromatic dicarboxylic acid and an aliphatic, a cycloaliphatic or an aliphatic diamine.

3. A process according to claim 1 or 2 wherein the prepolymer has a number average molecular weight of upto 5000.

TABLE 2

Effect of injection variables on polymer IV and colour

| RUN NO. | PRE-POLYMER IV (dl/g) | DIAMINE INJECTED | DIAMINE/WATER RATIO (vol) | IN-JECTION RATE (g/min) | % wt. DIAMINE INJECTED w.r.t. O/P | MOL % DIAMINE INJECTED w.r.t. O/P | COLOUR (1-5) | EXTRU-DATE IV (dl/g) | IV AFTER LAB POLYMn. (dl/g) |
|---|---|---|---|---|---|---|---|---|---|
| 1 | 0.25 | none | — | — | — | — | 3 | 0.32 | 0.46 |
| 2 | 0.25 | water | 0/100 | 8 | — | — | 3 | 0.32 | 0.38 |
| 3 | 0.25 | TMHMD | 100/0 | 2 | 10 | 18 | 3 | 0.28 | 0.55 |
| 4 | 0.25 | TMHMD | 100/0 | 4 | 20 | 36 | 3 | 0.4 | 0.58 |
| 5 | 0.25 | TMHMD | 100/0 | 8 | 40 | 73 | 3 | 0.42 | 0.81 |
| 6 | 0.3 | none | — | — | — | — | 3 | 0.32 | 0.55 |
| 7 | 0.3 | HMD | 60/40 | 6 | 18 | 45 | 1 | 0.65 | 0.82 |
| 8 | 0.3 | HMD | 60/40 | 10 | 30 | 74 | 1 | 0.69 | 0.92 |
| 9 | 0.3 | HMD | 60/40 | 15 | 45 | 112 | 1 | 0.66 | 0.84 |
| 10 | 0.3 | IPD | 60/40 | 6 | 18 | 30 | 1 | 0.47 | 0.63 |
| 11 | 0.3 | IPD | 60/40 | 15 | 45 | 76 | 1 | 0.62 | 0.8 |
| 12 | 0.35 | MXD | 60/40 | 10 | 30 | 64 | 1 | 1.07 | 1.92 |
| 13 | 0.35 | MXD | 60/40 | 10 | 30 | 64 | 1 | 1.14 | 1.68 |

NOTES
Prepolymer produced from TPA/TMHMD salt
Output = 1.2 Kg/hr

4. A process according to claim 1 wherein the prepolymer is in the form of a melt, in a granulated form or in a powdered form prior to further polymerisation.

5. A process according to claim 1 wherein the prepolymer is blended with polymerisation aids selected from the group consisting of catalysts, molecular weight regulators and colour stabilisers prior to further polymerisation.

6. A process according to claim 5 wherein the polymerisation aid is a catalyst and is selected from ammonium hypophosphite or metal hypophosphites.

7. A process according to claim 5 or 6 wherein the molecular weight regulator is selected from a monofunctional carboxylic acids or amines.

8. A process according to claim 1 wherein the extruder is a twin screw extruder.

9. A process according to claim 1 wherein the diamine is introduced into the extruder by injection.

10. A process according to claim 9 wherein the additional diamine is introduced into the extruder by injection of aqueous solution of the diamine into the extruder.

11. A process according claim 1 wherein the further polymerisation is carried out under a partial vacuum adjusted by a bleed of nitrogen gas.

* * * * *